(12) United States Patent
Beckman et al.

(10) Patent No.: US 11,232,389 B1
(45) Date of Patent: Jan. 25, 2022

(54) DELIVERY SOUND MASKING AND SOUND EMISSION

(71) Applicant: Amazon Technologies, Inc., Seattle, WA (US)

(72) Inventors: Brian C. Beckman, Newcastle, WA (US); Jack Erdozain, Jr., Miami, FL (US); Sheridan Leigh Martin, Des Moines, WA (US); Fabian Hensel, Seattle, WA (US); David Lindskog, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 334 days.

(21) Appl. No.: 16/132,101

(22) Filed: Sep. 14, 2018

Related U.S. Application Data

(63) Continuation of application No. 15/479,016, filed on Apr. 4, 2017, now Pat. No. 10,102,493, which is a (Continued)

(51) Int. Cl.
*G06Q 10/08* (2012.01)
*G10K 11/178* (2006.01)
(Continued)

(52) U.S. Cl.
CPC ....... *G06Q 10/0832* (2013.01); *B64C 39/024* (2013.01); *B64D 47/00* (2013.01);
(Continued)

(58) Field of Classification Search
CPC .... G10K 15/02; G10K 15/04; G10K 11/1752; G10K 2210/1281; G06Q 10/0832
See application file for complete search history.

(56) References Cited

U.S. PATENT DOCUMENTS 8,135,140 B2 3/2012 Shridhar et al.
9,056,676 B1 6/2015 Wang
(Continued)

OTHER PUBLICATIONS

Greenwood, T. (Feb. 17, 2009). Quiet cars may need alert for pedestrians. Detroit News Retrieved from https://dialog.proquest.com/professional/docview/404434287?accountid=131444 (Year: 2009).*

(Continued)

*Primary Examiner* — Michael P Harrington
(74) *Attorney, Agent, or Firm* — Lee & Hayes, P.C.

(57) ABSTRACT

An unmanned aerial vehicle (UAV) may emit masking sounds during operation of the UAV to mask other sounds generated by the UAV during operation. The UAV may be used to deliver items to a residence or other location associated with a customer. The UAV may emit sounds that mask the conventional sounds generated by the propellers and/or motors to cause the UAV to emit sounds that are pleasing to bystanders or do not annoy the bystanders. The UAV may emit sounds using speakers or other sound generating devices, such as fins, reeds, whistles, or other devices which may cause sound to be emitted from the UAV. Noise canceling algorithms may be used to cancel at least some of the conventional noise generated by operation of the UAV using inverted sounds, while additional sound may be emitted by the UAV, which may not be subject to noise cancelation.

20 Claims, 10 Drawing Sheets

Related U.S. Application Data continuation of application No. 14/977,455, filed on Dec. 21, 2015, now Pat. No. 9,646,597.

(51) Int. Cl.
  *G01C 21/20* (2006.01)
  *B64D 47/00* (2006.01)
  *B64C 39/02* (2006.01)
  *G05D 1/10* (2006.01)
  *G05D 1/00* (2006.01)
  *G01S 19/42* (2010.01)

(52) U.S. Cl.
  CPC ............ *G01C 21/20* (2013.01); *G10K 11/178* (2013.01); *B64C 2201/024* (2013.01); *B64C 2201/042* (2013.01); *B64C 2201/108* (2013.01); *B64C 2201/128* (2013.01); *B64C 2201/165* (2013.01); *G01S 19/42* (2013.01); *G05D 1/0088* (2013.01); *G05D 1/101* (2013.01); *G10H 2250/325* (2013.01); *G10H 2250/381* (2013.01); *G10H 2250/411* (2013.01); *G10H 2250/431* (2013.01); *G10K 2210/121* (2013.01); *G10K 2210/1281* (2013.01)

(56) References Cited

U.S. PATENT DOCUMENTS

| | | | |
|---|---|---|---|
| 9,153,223 | B2 | 10/2015 | Asao et al. |
| 9,177,542 | B2 | 11/2015 | Pan |
| 9,191,744 | B2 | 11/2015 | Anderson |
| 9,245,519 | B2 | 1/2016 | Klug et al. |
| 9,321,531 | B1* | 4/2016 | Takayama ............ B64C 39/024 |
| 9,352,834 | B2 | 5/2016 | Davies |
| 9,398,367 | B1 | 7/2016 | Scott et al. |
| 9,412,278 | B1* | 8/2016 | Gong ..................... G06F 16/29 |
| 9,415,870 | B1 | 8/2016 | Beckman et al. |
| 9,422,055 | B1 | 8/2016 | Beckman et al. |
| 9,442,496 | B1 | 9/2016 | Beckman et al. |
| 9,451,020 | B2 | 9/2016 | Liu et al. |
| 9,489,937 | B1 | 11/2016 | Beard et al. |
| 9,525,944 | B2 | 12/2016 | Clemen, Jr. |
| 2010/0208911 | A1 | 8/2010 | Maeda et al. |
| 2012/0166042 | A1* | 6/2012 | Kokido .................. B60Q 5/008 701/36 |
| 2013/0334365 | A1 | 12/2013 | Gall et al. |
| 2015/0010163 | A1 | 1/2015 | Ganeshkumar et al. |
| 2015/0055787 | A1 | 2/2015 | Ganeshkumar |
| 2015/0056058 | A1* | 2/2015 | Grissom .............. G10K 11/172 415/1 |
| 2015/0112518 | A1 | 4/2015 | Brusniak et al. |
| 2015/0148988 | A1 | 5/2015 | Fleck |
| 2015/0358728 | A1 | 12/2015 | Trammell |
| 2016/0044417 | A1 | 2/2016 | Clemen, Jr. |
| 2016/0063987 | A1 | 3/2016 | Xu et al. |
| 2016/0069994 | A1 | 3/2016 | Allen et al. |
| 2016/0083073 | A1 | 3/2016 | Beckman |
| 2016/0225366 | A1 | 8/2016 | Maeda et al. |
| 2016/0340006 | A1 | 11/2016 | Tang |

OTHER PUBLICATIONS

Office Action for U.S. Appl. No. 15/479,016, dated Dec. 28, 2017, Beckman, "Delivery Sound Masking and Sound Emission", 9 pages.

\* cited by examiner

DELIVERY SOUND MASKING AND SOUND EMISSION

CROSS-REFERENCE TO RELATED APPLICATION

This application is a continuation of, and claims priority to co-pending, commonly owned, U.S. patent application Ser. No. 15/479,016 filed Apr. 4, 2017 and entitled "Delivery Sound Masking and Sound Emission," which is a continuation of U.S. patent application Ser. No. 14/977,455 filed Dec. 21, 2015 issued as U.S. Pat. No. 9,646,597, and entitled "Delivery Sound Masking and Sound Emission," which are incorporated herein in their entirety by reference.

BACKGROUND

Use of unmanned aerial vehicles (UAVs) has become common by both hobbyists and commercial entities. In the commercial context, UAVs have been used for photography, delivery of items, and for other reasons. During these uses, the UAVs may be exposed to people, who can often see and hear the UAVs during operation. Once concern with the increase in popularity of UAVs is the increase in noise from these devices, which may annoy the people exposed to operation of the UAVs.

An increase in noise may or may not influence people's perception of use of UAVs depending on the type of noise generated. For example, people who live in an urban area are already surrounded by constant of noise from traffic, aircraft, sirens, and even neighbors. Some of these noises are annoying while others seem to fade together and are easily ignored (e.g., traffic sounds, etc.).

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
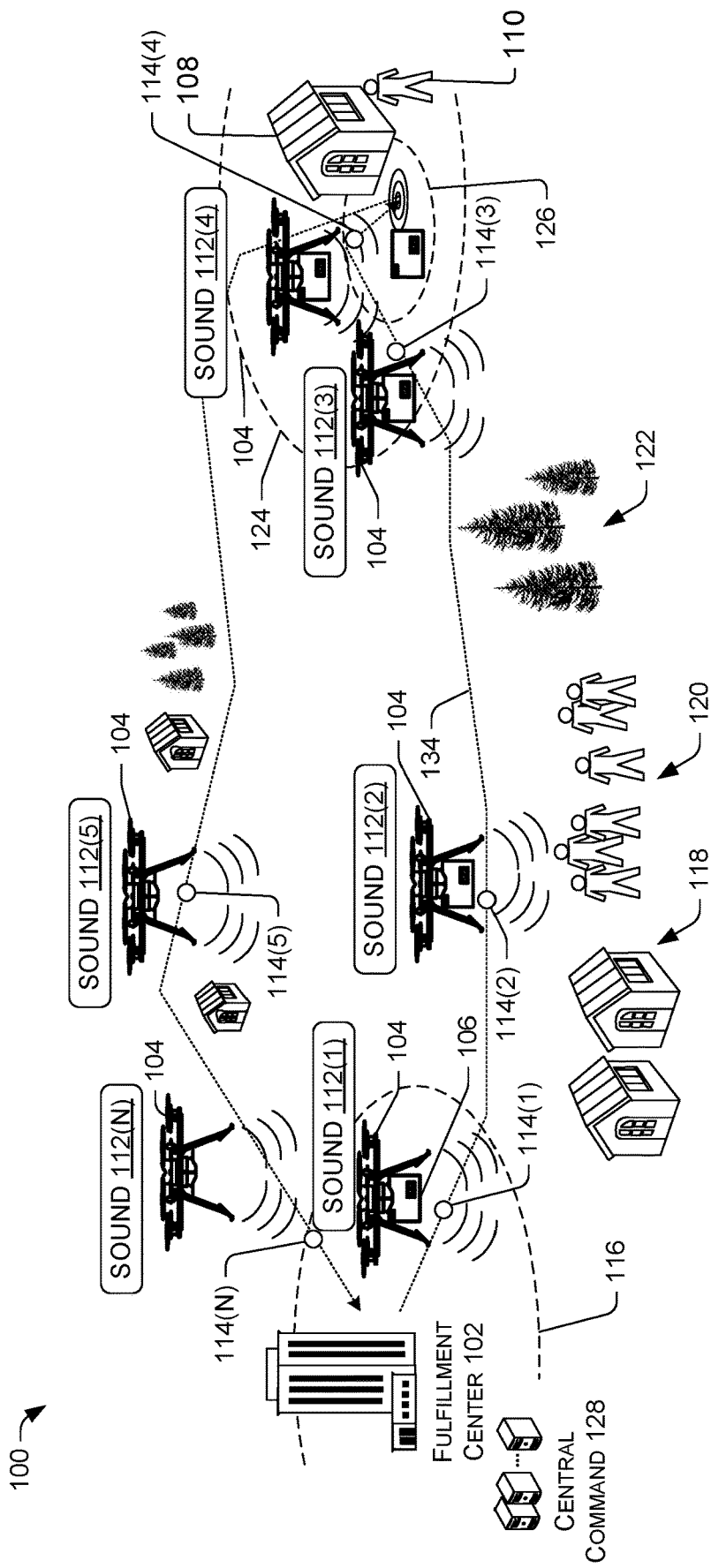
FIG. 1 is a schematic diagram of an illustrative environment that includes an unmanned aerial vehicle (UAV) emitting masking sounds during a delivery.

This disclosure is directed to masking sound generated by an unmanned aerial vehicle (UAV) during operation. The UAV may be used to deliver items to a residence or other location associated with a customer. During operation, the UAV may travel from a fulfillment center (FC), over or near populated areas of land, and to the destination. During travel by a conventional UAV, the propellers (rotors) and/or motors may generate sounds, which may be annoying or otherwise displeasing to bystanders that hear that those sounds. As disclosed herein, the UAV may emit sounds to mask the conventional sound generated by the propellers and/or motors to cause the UAV to emit sounds that are pleasing to bystanders or at least sounds that do not annoy the bystanders.

The UAV may emit sounds using speakers or other sound generating devices, such as fins, reeds, whistles, or other devices which may cause sound to be emitted from the UAV. In some embodiments, sound generating features may be coupled to propellers, motors, and/or drive shafts that couple the propellers to respective motors. Noise canceling algorithms may be used to cancel at least some of the conventional noise generated by operation of the UAV using inverted sounds, while additional sound may be emitted by the UAV, which may not be subject to noise cancelation.

The UAV may emit different sounds based on a stage of flight and/or location of the UAV. For example, the UAV may emit a first sound during takeoff from the FC, a second sound during flight at a cruising altitude, a third sound during an approach to the destination, and a fourth sound when the UAV is near or over the destination. In some embodiments, the UAV may dynamically select sounds to emit based on a location of the UAV. For example, the UAV may emit different sounds when located in an urban area than when the UAV is located in a rural or forested area. In the urban area, the UAV may emit sounds that blend in with typical city noises (e.g., sounds of calmly moving traffic, muffled sounds, etc.), while in the rural area and/or forested area, the UAV may emit sounds that blend in to those respective areas (e.g., sounds of animals and/or birds, sounds of wind, sounds of water, sounds of movement of trees, etc.).

In some embodiments, the sounds emitted by the UAV may be selected by the customer or may be based on information about the customer. For example, the customer may be one of multiple people in a dwelling that can receive deliveries by a UAV. A particular customer may request the UAV to play a specific sound so that the customer can easily identify the delivery as being for her and not one of the other people in the dwelling. In some embodiments, the sound may be selected for the customer based on information gathered about the customer, such as information about prior purchases using transaction history, profile information or customer account information, and/or other information that can readily be used to associate a sound with the customer that the customer may find agreeable and not annoying.

In various embodiments, the UAV may emit sounds near a destination, where the sounds are associated with a manufacturer of an item in the delivery or other entity associated with the item. The UAV may emit special event sounds when approaching a destination or near the destination. Special event sounds may include a birthday song, a song associated with a sports team favored by the customer or associated with the customer (e.g., alma mater song, etc.), a holiday song, or other sounds associated with special events. In some embodiments, listeners (bystanders) of the sounds emitted by the UAVs may provide feedback to a service, which may use the feedback to select or rank sounds to be used by the UAVs.

The techniques and systems described herein may be implemented in a number of ways. Example implementations are provided below with reference to the following figures.

FIG. 1 is a schematic diagram of an illustrative environment 100 that includes a UAV emitting masking sounds during a delivery. The environment 100 may include a fulfillment center (FC) 102 that deploys UAVs, such as a UAV 104 to deliver packages 106 to destinations, such as a destination 108 associated with a customer 110.

The UAV 104 may be configured to mask sound generated from operation of the UAV 104 during flight, such as conventional sound from rotation of the propellers and/or from the motors. The UAV 104 may use noise cancelation to cancel at least some of these conventional noises, and thereby may generate an inverted sound to cancel at least some of the conventional noises. The UAV 104 may emit different sounds 112(1), . . . , 112(N) during different stages of flight and/or at different locations, such as at locations 114(1), . . . 114(N) shown in FIG. 1.

For example, when the UAV 104 is at or traveling near a first location 112(1) within a first threshold distance 116 from the FC 102 or from another departure location, the UAV may emit a first sound 112(1), such as to announce or indicate departure from the FC 102. The UAV may emit the sound as the UAV travels from the location, and thus is not limited to only emitting the sounds at a particular location, but instead may emit the sound during flight between locations.

The UAV 104 may progress to a second location 114(2) during flight, which may be a location at a cruising altitude. At or when traveling near the second location 114(2), the UAV may emit a second sound 112(2). In some embodiments, the UAV may select the second sound based on attributes associated with the second location 114(2), such as the presence of buildings 118, the presence of people 120, the presence of wildlife 122, and/or other attributes. For example, when the second location 114(2) is associated with the presence of building in an urban area, the UAV 104 may cause emission of the second sound 112(2) to "harmonize" or otherwise mimic urban sounds, for example. However, the second sound may be selected to including other types of sounds, such as sounds from nature, animal or bird sounds, and/or other types of sounds as discussed below.

As the UAV 104 approaches the destination 108, the UAV 104 may enter a second threshold distance 124 from the destination 108 and may be at or traveling near a third location 114(3). When the UAV 104 is within the second threshold distance 124, but not yet within a third threshold distance 126 from the destination 108, the UAV may emit a third sound 112(3) during an approach to the destination 108. The third sound 112(3) may signify the approach of the UAV and may be selected as a sound that is expected to be heard by the customer 110, if present at the destination 108. For example, the third sound 112(3) may be an announcement sound or song, a sound selected by the customer 110, a nature sound, a soothing shy sound, a gentle animal sound, a sound associated with a fictitious or real person, a cartoon character, or a robot, and/or other sounds that create a calming effect on listeners. In some embodiments, the third sound 112(3) may be a special event sound (e.g., a sports themed sounds, a birthday song, etc.) or a sound associated with a commercial entity associated with one of the items in the package 106 (e.g., a theme song, an advertising jingle, etc.).

The UAV 104 may emit a fourth sound 112(4) when the UAV 104 is at or traveling near a fourth location 114(4) within the third threshold 126 from the destination, which may be during a deposit of the package 106 at the destination 108. The fourth sound 112(4) may announce the deposit of the item, warn bystanders of the UAV's presence, and/or provide other information. The UAV 104 may then depart from the destination 108.

After depositing the package 106 at the destination 108, the UAV may emit a fifth sound 112(5), such as during travel to/from a fifth location 114(5) at the cruising altitude. The fifth sound 112(5) may be selected in a similar way as the second sound 112(2). When the UAV 104 returns within the first threshold distance 116 from the FA 102, such as at or near a sixth location 114(N), the UAV may emit a last sound 112(N), such as to announce or indicate arrival at the FC.

In some embodiments, the sounds emitted by the UAV 104 may be selected by a central command 128, which may control various operations of the UAV, including flight plans of the UAV and/or other high level decision making. However, the UAV 104 may be configured to navigate at least partially using autonomous controls in case the UAV loses communication with the central command 128 and for other reasons. Thus, the UAV may determine flight plans in some embodiments. The central command 128 may interface with the customer 110, directly or indirectly, to select one or more of the sounds 112(1)-(N) to be emitted by the UAV.

In various embodiments, the sounds selected for emission by the UAV 104 may be themed as anthropomorphic sounds that personify the UAV to at least some degree. For example, the UAV may emit sounds during performance of certain actions and may emit other sounds during a transition between actions. These sounds may create a character-like persona and/or alert bystanders about actions performed by the UAV 104. In some instances, the UAV 104 may emit cartoon-like sounds, robot sounds, or other themed sounds that create a playful persona.

Figure 2A:
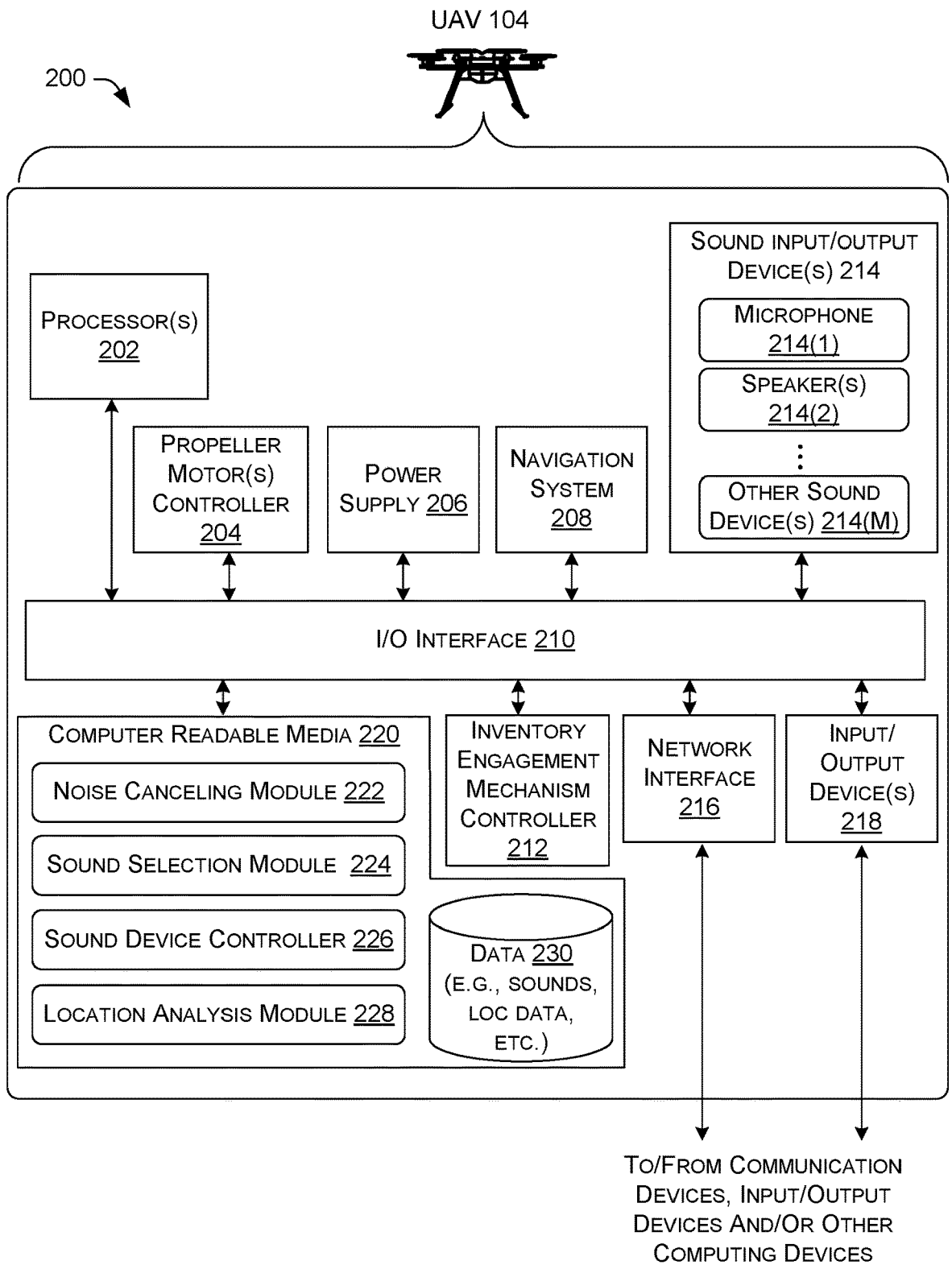
FIG. 2A is a block diagram of an illustrative UAV architecture.

FIG. 2A is a block diagram of an illustrative UAV architecture 200 of the UAV 104. The UAV architecture 200 may be used to implement the various systems, devices, and techniques discussed above. In the illustrated implementation, the UAV architecture 200 includes one or more processors 202, coupled to a non-transitory computer readable media 220 via an input/output (I/O) interface 210. The UAV architecture 200 may also include a propeller motor controller 204, power supply module 206 and/or a navigation system 208. The UAV architecture 200 further includes an inventory engagement mechanism controller 212, sound input/output device(s) 214, a network interface 216, and one or more input/output devices 218.

In various implementations, the UAV architecture 200 may be implemented using a uniprocessor system including one processor 202, or a multiprocessor system including several processors 202 (e.g., two, four, eight, or another suitable number). The processor(s) 202 may be any suitable processor capable of executing instructions. For example, in various implementations, the processor(s) 202 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 202 may commonly, but not necessarily, implement the same ISA.

The non-transitory computer readable media 220 may be configured to store executable instructions/modules, data, flight paths, and/or data items accessible by the processor(s) 202. In various implementations, the non-transitory computer readable media 220 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described above, are shown stored within the non-transitory computer readable memory. In other implementations, program instructions, data and/or flight paths may be received, sent or stored upon different types of computer-accessible media, such as non-transitory media, or on similar media separate from the non-transitory computer readable media 220 or the UAV architecture 200. Generally speaking, a non-transitory, computer readable memory may include storage media or memory media such as flash memory (e.g., solid state memory), magnetic or optical media (e.g., disk) coupled to the UAV architecture 200 via the I/O interface 210. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 216.

In one implementation, the I/O interface 210 may be configured to coordinate I/O traffic between the processor(s) 202, the non-transitory computer readable media 220, and any peripheral devices, the network interface or other peripheral interfaces, such as input/output devices 218. In some implementations, the I/O interface 210 may perform any necessary protocol, timing or other data transformations to convert data signals from one component (e.g., non-transitory computer readable media 220) into a format suitable for use by another component (e.g., processor(s) 202). In some implementations, the I/O interface 210 may include support for devices attached through various types of peripheral buses, such as a variant of the Peripheral Component Interconnect (PCI) bus standard or the Universal Serial Bus (USB) standard, for example. In some implementations, the function of the I/O interface 210 may be split into two or more separate components, such as a north bridge and a south bridge, for example. Also, in some implementations, some or all of the functionality of the I/O interface 210, such as an interface to the non-transitory computer readable media 220, may be incorporated directly into the processor(s) 202.

The propeller motor(s) controller 204 communicates with the navigation system 208 and adjusts the power of each propeller motor to guide the UAV along a determined flight path. The power supply module 206 may control the charging and any switching functions associated with one or more power modules (e.g., batteries) of the UAV.

The navigation system 208 may include a GPS or other similar system that can be used to navigate the UAV to and/or from a location. The navigation system may track a stage of flight of the UAV (e.g., cruising, approach, takeoff, landing, etc.), an altitude, and/or a position of the UAV relative to the destination. The inventory engagement mechanism controller 212 communicates with the actuator(s) or motor(s) (e.g., a servo motor) used to engage and/or disengage inventory. For example, when the UAV is positioned over a level surface at a delivery location, the inventory engagement mechanism controller 212 may provide an instruction to a motor that controls the inventory engagement mechanism to release the inventory.

The sound input/output device(s) 214 may include a microphone 214(1), including microphone arrays, speaker(s) 214(2), possibly including a speaker array, and/or other sounds device(s) 214(M). The speaker(s) and/or sound devices 214(M) may be controlled by a sound device controller 226 to cause the UAV to emit one or more sounds, such as a sound that masks at least some sound generated by the propellers and/or motors of the UAV 104. Illustrative sound devices 214(M) are shown and described with reference to FIG. 3. The microphone 214(1) may be used by a noise canceling module 222 in coordination with the speaker(s) 214(2) to cancel at least some of the sound generated by the propellers and/or motors of the UAV 104. The speaker(s) 214(2) may be controlled at different times to emit sounds to mask the sounds of the UAV, to mimic environmental sounds, and/or to emit other noises that calm, sooth, reassure, and/or avoid annoying bystanders.

The network interface 216 may be configured to allow data to be exchanged between the UAV architecture 200, other devices attached to a network, such as other computer systems (e.g., the central command 128, etc.), and/or with UAV control systems of other UAVs. For example, the network interface 216 may enable wireless communication between numerous UAVs. In various implementations, the network interface 216 may support communication via wireless general data networks, such as a Wi-Fi network. For example, the network interface 216 may support communication via telecommunications networks such as cellular communication networks, satellite networks, and the like.

Input/output devices 218 may, in some implementations, include image capture devices, infrared sensors, time of flight sensors, accelerometers, lights, speakers, and other input/output devices commonly used in aviation. Multiple input/output devices 218 may be present and controlled by the UAV architecture 200. One or more of these sensors may be utilized to assist in landings as well as avoiding obstacles during flight.

In some embodiments, the computer readable media 220 may store the noise canceling module 222, a sound selection module 224, the sound device controller 226, and a location module 228, which are described in turn. The components may be stored together or in a distributed arrangement. The computer readable memory may also store data 230, such as sounds, location information used to select sounds, and/or other data usable by the various modules.

The noise canceling module 222 may employ sound cancelation algorithms that receive a sound signal input from the microphone 214(1), create inverted sound signals that cancel at least part of the sound generated by the UAV, and cause the speaker(s) to emit sound based on the inverted sound signals. In various embodiments, the noise canceling module 222 may cancel or target for cancelation "annoying" portions of sound generated by the UAV, such as to cancel some, but not all of the sounds emitted by the UAV.

The sound selection module 224 may select sounds to be emitted by the UAV, such as by the speaker(s) 214(2) and/or by the sound devices 214(M). The sound selection module 224 may access sounds from the data 230, such as prerecorded sounds, jingles, and/or other sounds for emission by the UAV. In some embodiments, the sound selection module 224 may select sounds based on attributes of an environment (e.g., populated areas, urban area, forested area, rural area, etc.), distance from a deployment location, distance from a destination, stage of flight, and/or other factors.

The sound device controller 226 may control emission of sound by the speaker(s) 214(2) and/or by the sound devices 214(M) to cause the devices to emit sound selected by the sound selection module 224. The sound device controller 226 may manipulate the sound devices 214(M) to cause the sound devices to make different sounds and/or cease making sounds, such as when the sound devices 214(M) include whistles, reeds, and/or other devices that generate noise based on airflow across or through a component.

The location analysis module 228 may determine attributes about a location, such as an environment that the UAV 104 is currently within, to inform the sound selection module 224 about sounds that may be appropriate for that location/environment. For example, the location analysis module 228 may detect presence of buildings and urban area features, which may direct the sound selection module 224 to select a first set of sounds for emission by the UAV 104. As another example, the location analysis module 228 may detect presence of animals, farms, and other rural features, which may direct the sound selection module 224 to select a second set of sounds for emission by the UAV 104.

Additional operation of the various modules discussed above is provided with reference to the various flow diagrams below described with reference to FIGS. 4-9.

In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the UAV architecture 200 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The UAV architecture 200 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated UAV architecture 200. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the UAV architecture 200 may be transmitted to the UAV architecture 200 via transmission media or signals such as electrical, electromagnetic, or digital signals, conveyed via a communication medium such as a wireless link. Various implementations may further include receiving, sending or storing instructions and/or data implemented in accordance with the foregoing description upon a computer-accessible medium. Accordingly, the techniques described herein may be practiced with other UAV control system configurations.

Additional information about the operations of the modules of the UAV 104 is discussed below with reference to the flow diagrams.

Figure 2B:
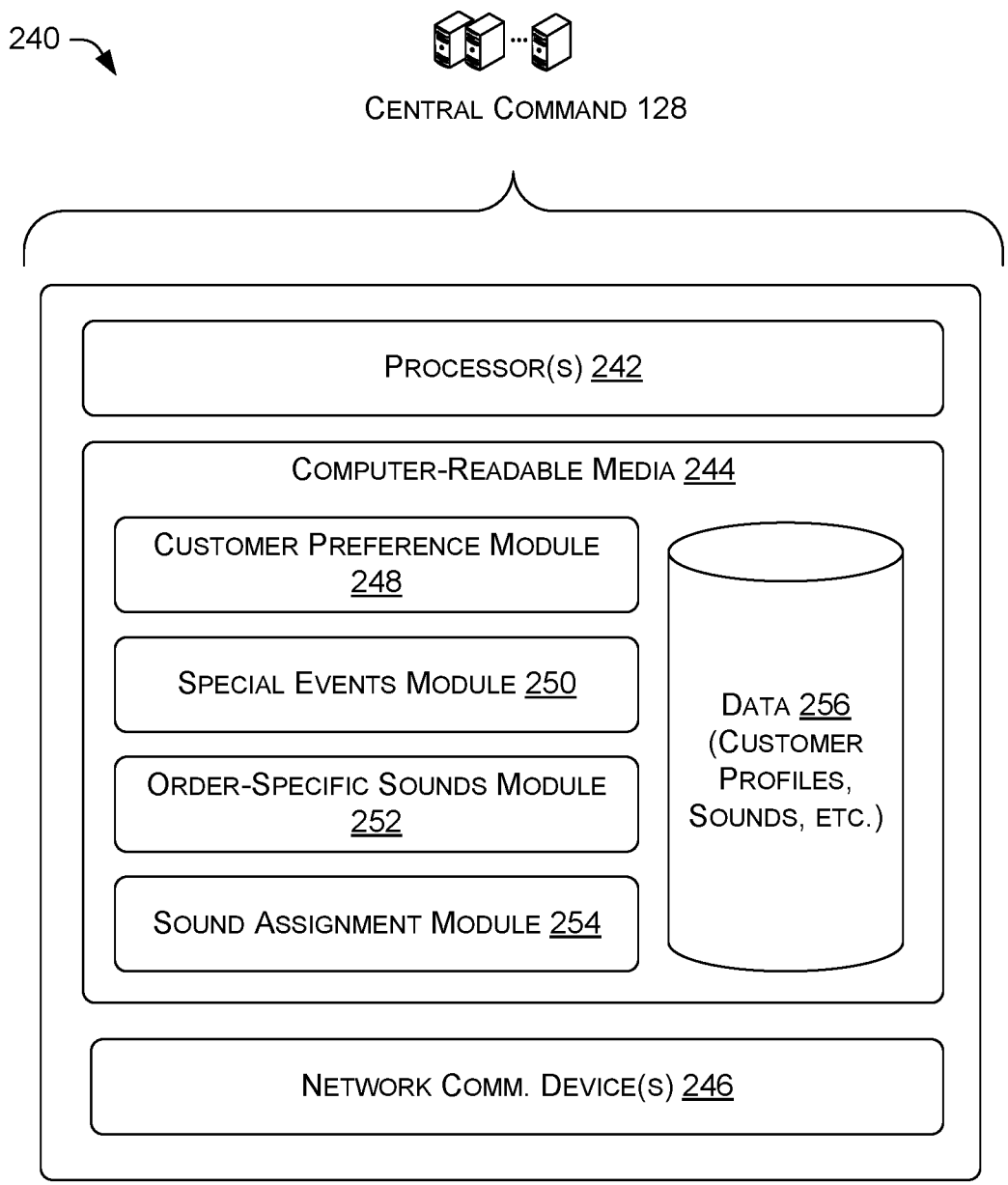
FIG. 2B is a block diagram of an illustrative computing architecture of a central command that exchanges communications with the UAV shown in FIG. 2A.

FIG. 2B is a block diagram of an illustrative computing architecture 240 of the central command 110 that exchanges communications with the UAV 104. The computing architecture 240 may include one or more processors 242 and one or more computer readable media 244 that stores various modules, applications, programs, or other data. The computer-readable media 244 may include instructions that, when executed by the one or more processors 242, cause the processors to perform the operations described herein for the central command 110. The architecture 240 may also include network communication devices 246 to facilitate communication with other devices, such as using wired and/or wireless networks.

Embodiments may be provided as one or more a computer programs including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store a customer preference module 248, a special events module 250, an order-specific sounds module 252, and a sound assignment module 254, which are described in turn. The components may be stored together or in a distributed arrangement. The computer-readable media 242 may also include data 256. The data 256 may include a customer profile data, sounds, special events, and/or other data used by the various modules discussed herein.

The customer preference module 248 may enable a customer to specify sounds to be emitted by the UAV at one or more stages of the flight of the UAV. In some embodiments, the customer preference module 248 may receive a selection of a sound, song, and/or other audible noise to be associated with the customer. The sound may then be emitted by the UAV 104, such as during the approach (e.g., as the third sounds 112(3) described above with reference to FIG. 1) and/or during the deposit of a package (e.g., as the forth sound 112(4) described above with reference to FIG. 1). The customer preference module 248 may restrict selection to refrain from causing the UAV to emit sounds deemed annoying, offensive, or otherwise disliked by a threshold number or percentage of bystanders.

In some embodiments, the customer preference module 248 may select a sound for the customer based on information associated with the customer. For example, the customer preference module 248 may select sounds based on prior purchases by the customer, information in a customer's profile or account, information posted by the customer in a social network site, and/or other information. For example, the customer preference module 248 may determine a customer's alma mater, and may select a school song for the alma mater to play for the customer. As another example, the customer preference module 248 may determine that the customer likes classical music based on prior purchase or selections by the customer, and thus may cause the UAV to play classical music or sounds that resemble classical music during at least a portion of the delivery of a package to the customer.

The special events module 250 may determine special events associated with the customer (e.g., birthday, graduation, etc.) and/or general special events, such as community events in a community of the customer. The special events module 250 may select sounds associated with the special events, which may be emitted by the UAV at one or more stages of the flight of the UAV to the destination 108. For example, the special events module 250 may determine that it is the customer's birthday, and may select a birthday song to emit during a portion of the flight of the UAV. As another example, the special events module 250 may determine that the day of delivery is a same day as an important sporting event favored by the customer, and the special events module 250 may select a sound associated with the sporting event.

The order-specific sounds module 252 may select sounds based on the contents of the order. For example, some commercial entities (e.g., producers, suppliers, and/or manufacturers) of goods have jingles or other distinctive sounds that are associated with such entities. The order-specific sounds module 252 may select a sounds associated with a commercial entity. In various embodiments, the order-specific sounds module 252 may select sounds associated with actual items in the delivery, such as songs from fixed-media music being delivered to the customer.

The sound assignment module 254 may assign the UAV 104 to load and/or emit selected sounds at certain times and/or during certain events during the flight of the UAV 104 to/from the destination 108 associated with the customer 110. For example, the sound assignment module 254 may cause the UAV to load a birthday song to be played for the customer as the UAV arrives at the destination 108. The sound assignment module 254 may upload the sounds and/or rules for emitting the sounds to the UAV 104 prior to deployment of the UAV 104 and/or during flight of the UAV (using a wireless network). The rules may be associated with different stages of flight, different waypoints, and/or other triggers.

Figure 3:
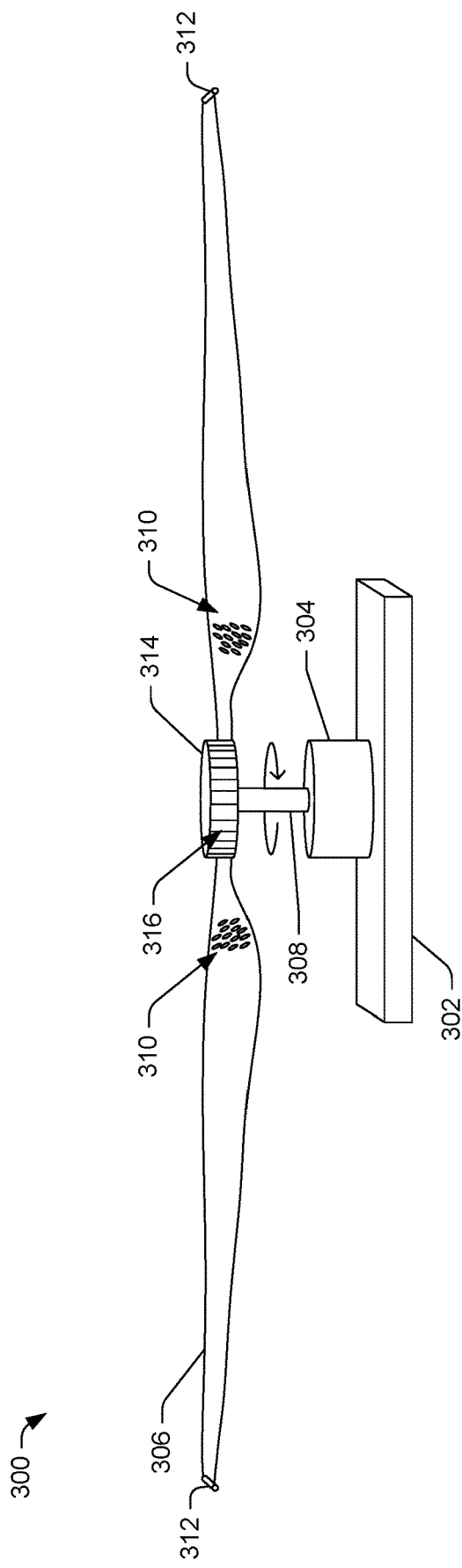
FIG. 3 is a perspective view of an illustrative propulsion system that includes one or more different sound masking devices.

FIG. 3 is a perspective view of an illustrative propulsion system 300 that includes one or more different sound masking devices. The propulsion system 300 includes an example of one of multiple possible propulsion systems used on a UAV, such as the UAV 104. For example, the propulsion system 300 may include 4, 6, 8 or another number of propulsion units on a given UAV depending on a configuration of the UAV.

The propulsion system 300 may include a frame 302, a motor 304, a propeller 306, and a drive shaft 308 coupled to the motor 304 and the propeller 306. The motor 304 may cause rotation of the drive shaft 308 and the propeller 306 in response to power supplied by an electronic speed control ESC. The propulsion system 300 may include one or more of the sound devices 214(M), which may cause emission of sound during rotation of the drive shaft 308 and the propeller 306.

A first sound device 310 may include static features coupled to the propeller 306. The static features may be dimples, cavities, cuts, edges, and/or other features that cause generation of sound when the propeller rotates at given speeds. The first sound device 310 may be used to reduce sound generated from the propeller and/or modify the sound caused by the propeller to make the sound less annoying or less of a nuisance to listeners (bystanders). In some embodiments, the first sound device 310 may be integrally formed in the blades of the propeller.

A second sound device 312 may be located proximate to ends of the propeller 306 and coupled to the propeller 306. The second sound device 312 may include features that cause emission of sound during rotation of the propeller caused by airflow, such as to create a whistle or similar sounds. For example, the second sound device may be implemented as a slide whistle. Unlike the first sound device 310, the second sound device 312 may include one or more actuators to cause change in the sound output or caused to be output by the second sound device 312. The actuators may change an orientation of the second sound device 312 and/or an orientation of a component of the second sound device (e.g., a reed, a fin, an aperture, etc.). By controlling the actuators, via the sound device controller 226, the second sound device 312 may emit a fluctuating sound, which may be more soothing and calming than a flat and constant sound or whistle. The sound device controller 226 may cause movement of the second sound device using predetermined controls, random controls, or a combination of both to create sounds that mask conventional sounds generated by propellers and motors of a UAV. The second sound device 312 may be coupled to all propellers, or selected propellers at both ends or at a single end.

A third sound device 314 may be coupled to the propeller 306 and/or the drive shaft 308 and may rotate under control of the motor 304. The third sound device may include movable features 316, such as fins, reeds, or other components that may vary sound caused by airflow about the third sound device 314 during rotation. The moveable features 316 may open (expose more airflow across a noise-generating surface) and close (reduce or terminate airflow across the noise-generating surface). The sound device controller 226 may control movement of the movable features, which may be moved by actuators. In some embodiments, the third sound device 314 may simulate playing of a harmonica by selectively directing airflow into different sound-making components of the third sound device 314. By controlling the actuators, via the sound device controller 226, the third sound device 314 may emit a fluctuating sound, which may be more soothing and calming than a flat and constant sound or whistle. The sound device controller 226 may cause movement of the moveable features 316 of the sound device 314 using predetermined controls, random controls, or a combination of both to create sounds that mask conventional sounds generated by propellers and motors of a UAV. The second sound device 312 may be coupled to all propellers or drive shafts, or selected propellers or drive shafts.

In some embodiments, the motors 304 may be configured to generate predetermined sounds that mask conventional sounds caused by motors. For example, the motor 304 may include fins, reeds, and/or other features that cause emission of sound during operation of the motor 304 at different speeds, which may create sounds that mask conventional sounds generated by propellers and motors of a UAV. In some embodiments, an audio signal may be overlaid with a pulse width modulation (PWM) signal used to control the motor 304. The audio signal may create a recognizable sound when the motor operates. This audio signal may be selected to mask at least part of the sound generated during normal or conventional operation of the motor (e.g., masking parts of sound not associated with the audio signal).

FIGS. 4-9 are flow diagrams of illustrative processes. The processes are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. The processes discussed below may be combined in any way to create derivative processes that are still within the scope of this disclosure.

Figure 4:
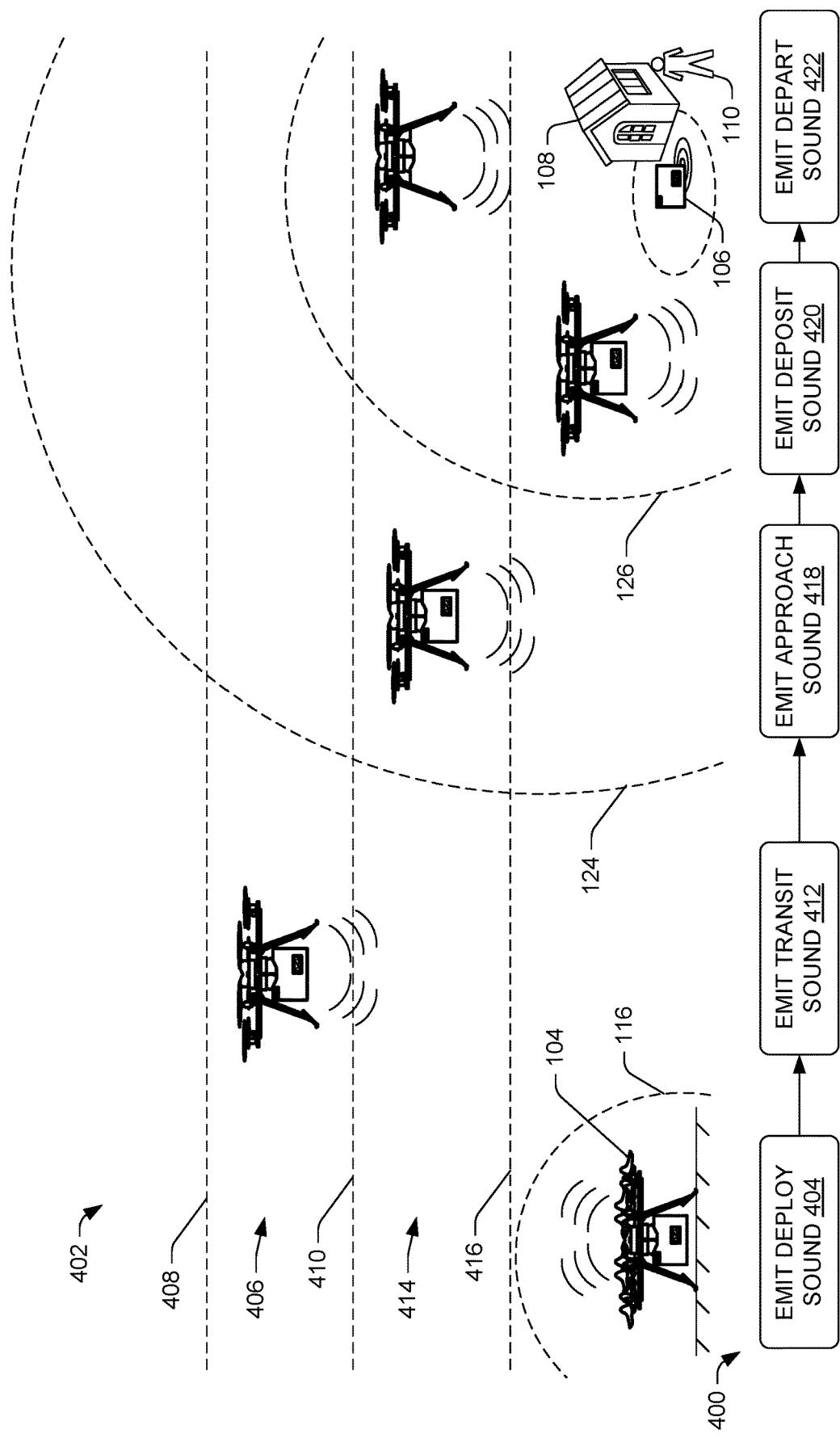
FIG. 4 is a pictorial flow diagram of an illustrative process to emit different sounds at different stages of flight by a UAV.

FIG. 4 is a pictorial flow diagram of an illustrative process 400 to emit different sounds at different stages of flight by a UAV through airspace 402. The process 400 is described with reference to the environment 100 and the architectures 200 and 240. The airspace 402 may include the first threshold distance 116 from the location of deployment (e.g., from a fulfillment center or other location), the second threshold distance 124 from the destination 108, and the third threshold distance from the destination 108.

At 404, the UAV 104 may emit a deployment sound, which may create awareness of the deployment. For example, the deployment sound may notify workers in a fulfillment center or service center that the UAV 104 is being deployed, powering up, and/or initiating flight.

The UAV 104 may gain altitude to a cruising airspace 406 between a first altitude 408 and a second altitude 410. At 412, while in the cruising airspace 406, the UAV 104 may emit a transit sound. The transit sound may be used to mask a conventional sound of the UAV. The transit sound may be associated with a calming or shy sound that is not offensive and not annoying. Examples of possible transit sounds may include sounds of birds, sounds of animals, sounds of water, wind sounds, sounds of calm traffic, sound associated with a fictitious or real person, a cartoon character, or a robot, and/or other typical sounds associated with an the environment in which the UAV flies that are not otherwise a nuisance. The transit sounds may be updated as the UAV enters different environments, such as when the UAV moves from an urban environment to a rural environment, the transit sounds may change from a first transit sound to a second, different transit sound that is more closely associated with the environment in which the UAV operates. In some embodiments, emission of the transit sounds may be contingent on a proximity of people, such that no sound is emitted when the UAV is far from people that might hear the UAV.

The UAV 104 may lower altitude to an approach airspace 414 between the second altitude 410 and a third altitude 416. At 418, while in the approach airspace 414 and/or within the second threshold distance 124, the UAV 104 may emit an approach sound. The approach sound may be used to mask a conventional sound of the UAV. In some embodiments, the approach sound may be similar to the transit sounds. However, the approach sound may be different, and may be used to announce an arrival of the UAV to the customer 110, to a location, and/or provide other information. For example, the approach sound may be a sound associated with a specific UAV used to service a particular area (e.g., UAV "Bill" that delivers items to a first portion of a neighborhood, etc.). The approach sound may be a customer selected sound that enables the customer 110 to identify the UAV as delivering an item to the customer. In various embodiments, the approach sound may be associated with the customer, the contents of the delivery, and/or a special event, as described above. The approach sound may be used to mask other sounds generated during operation of the UAV.

The UAV 104 may lower altitude below the third altitude 416. At 420, while below the third altitude and/or within the third threshold distance 126 from the destination 108, such as when the UAV 104 is near or over the destination and just before and/or during deposit of the package 106, the UAV 104 may emit a deposit sound. The deposit sound may be used to mask a conventional sound of the UAV. In some embodiments, the deposit sound may be similar to the approach sound. However, the deposit sound may be different, and may be used to announce a deposit of the package 106 by the UAV to the customer 110, to a location, and/or provide other information. For example, the deposit sound may provide instructions and/or a warning to bystanders about the imminent deposit of the package at the destination 108. The deposit sound may be a customer selected sound that enables the customer 110 to identify the UAV as delivering an item to the customer. In various embodiments, the deposit sound may be associated with the customer, the contents of the delivery, and/or a special event, as described above.

At 422, the UAV may emit a departing sound. The departing sound may serve a similar function as the deploy sound at the operation 404, but may be a different sound. Upon return to the fulfillment center or during later flight, the UAV may also emit sounds, such those described above, possibly using similar triggers (e.g., zones, altitudes, airspaces, etc.) as discussed above.

Figure 5:
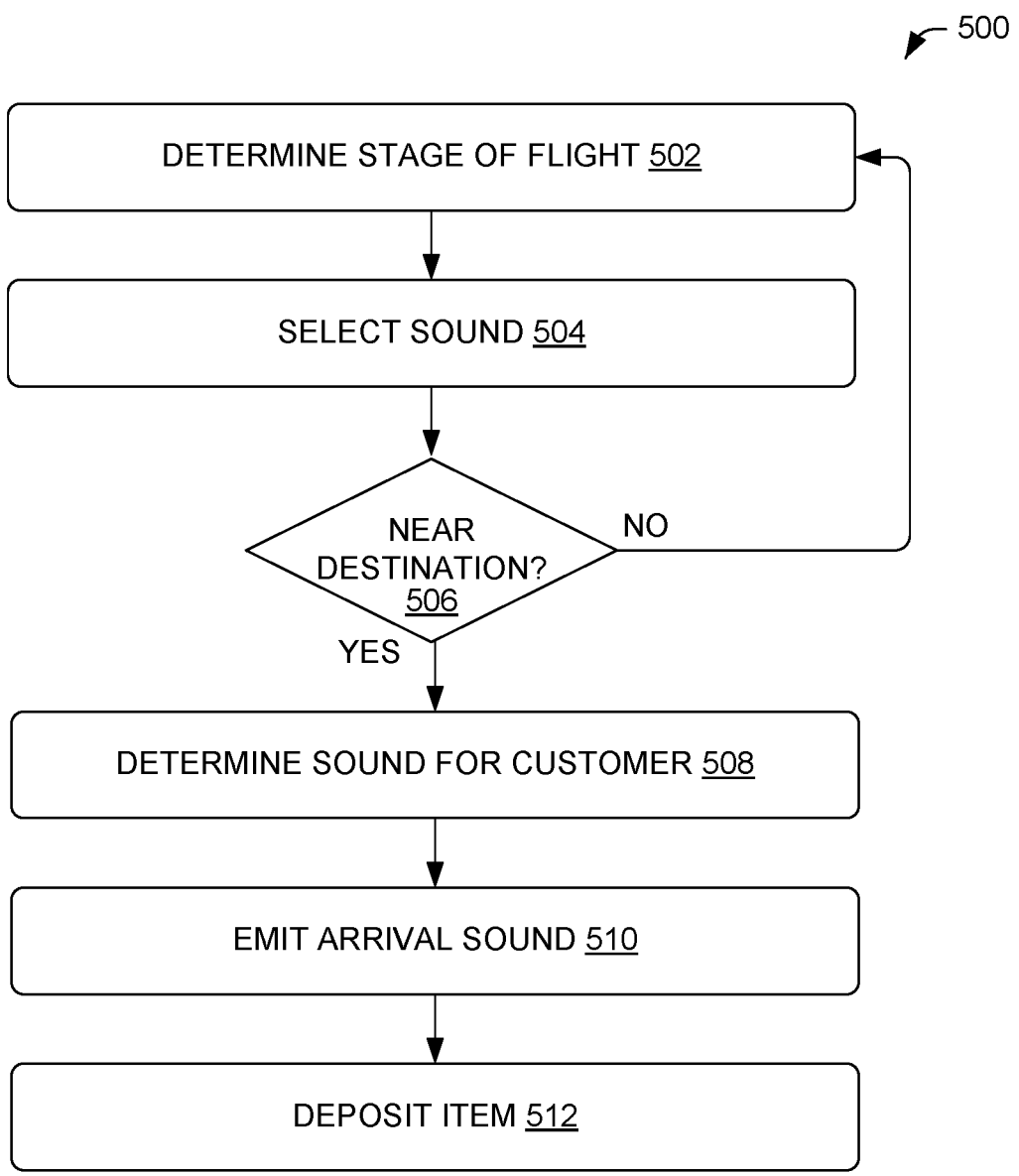
FIG. 5 is a flow diagram of an illustrative process to emitting masking sounds during a delivery, some of the sounds possibly being selected based on information associated with a customer of the item(s) in the delivery.

FIG. 5 is a flow diagram of an illustrative process 500 to emitting masking sounds during a delivery, some of the sounds possibly being selected based on information associated with a customer of the item(s) in the delivery. The process 500 is described with reference to the environment 100 and the architectures 200 and 240.

At 502, the sound selection module 224, possibly using input from the location analysis module 228 and/or the navigation system 208, may determine a stage of flight of a UAV. The stage of flight may be any of the stages discussed with respect to the environment 100 and/or the process 400. The stages may include takeoff, cruising, approach, landing, package deposit, and/or other stages. In some embodiments, changes from one environment to another different environment be considered a change in stages, such as traveling at a cruising altitude from an urban environment to a rural environment or from a human populated environment to a non-populated environment.

At 504, the sound selection module 224 may select a sound based on the determination at the operation 502. The sound selection module 224 may apply rules that associate that stage of flight and/or other parameters, with sounds to be emitted by the UAV via the speaker 214(2) and/or the sound device 214(M). The selected sounds may not be customer specific since the UAV is not yet near the destination associated with the customer.

At 506, the navigation system 208 may determine whether the UAV is near a destination, such as within the second threshold distance 124 or within the third threshold distance 126. When the UAV is not near the destination (following the "no" route from the decision operation 506), then the process 500 may return to the operation 502 for continued processing. When the UAV 104 is near the destination (following the "yes" route from the decision operation 506), then the process 500 may advance to an operation 508.

At 508, the sound selection module 224 may determine a sound to emit for the customer. The sound may be preselected by the customer using the customer preference module 248 or selected based on information about the customer. In some embodiments, the sound may be recognizable by the customer to enable the customer to identify the sound as meaning that the customer's package is nearby and will be delivered shortly.

At 510, the sound device controller 226 may cause the speakers 214(2) and/or the sound devices 214(M) to emit the sound selected at the operation 508. At 512, the UAV may deposit the item at the destination. The UAV may continue to play the sound selected at the operation 508 until an endpoint, which may be a threshold amount of time after depositing the package 106 at the destination 108 (including zero minutes).

Figure 6:
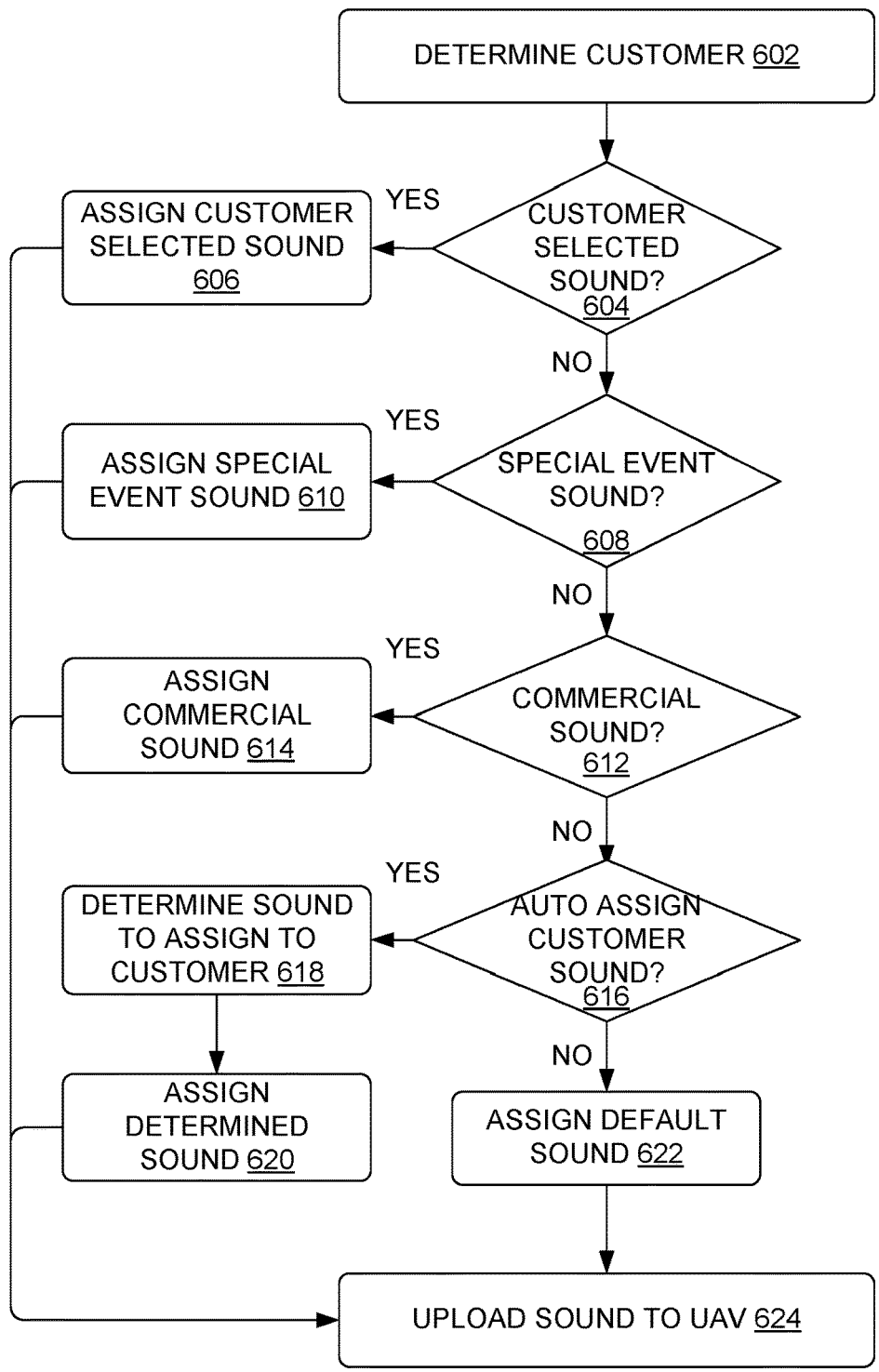
FIG. 6 is a flow diagram of an illustrative process to select custom sounds for use during a delivery of a package by the UAV.

FIG. 6 is a flow diagram of an illustrative process 600 to select custom sounds for use during a delivery of a package by the UAV. The process 600 is described with reference to the environment 100 and the architectures 200 and 240. The process may be performed by the central command.

At 602, the customer preference module 248 may identify a customer to receive a delivery. The customer may be identified based on an order processed by the fulfillment center 102. The customer preference module 248 may access the data 256, which may include information about the customer's preferences and/or other information associated with the customer. The data 256 may also include other information related to items in an order for the customer (e.g., included in the package 106) and/or other information that may be used to select a sound to be emitted by the UAV during a delivery of the package to the customer.

At 604, the sound assignment module 254 may determine to select a customer selected sound to be assigned to the UAV for emission during the delivery. When a customer selected sound is available and to be used (following the "yes" route from the decision operation 604), then the process 600 may advance to an operation 606 to assign the customer selected sound for use by the UAV during the delivery of the package 106 to the customer. When the customer selected sound is not available or not to be used (following the "no" route from the decision operation 604), then the process 600 may advance to a decision operation 608.

At 608, the sound assignment module 254 may determine to select a special event sound to be assigned to the UAV for emission during the delivery. A special event sound may be associated with an event that is important or otherwise of interest to the customer, such as a birthday, a sporting event, and/or other "event" or "special" sounds recognizable by the customer and/or bystanders that may hear the sound. When a special event sound is available and to be used (following the "yes" route from the decision operation 608), then the process 600 may advance to an operation 610 to assign, via the special events module 250, the special event sound for use by the UAV during the delivery of the package 106 to the customer. When the special event sound is not available or not to be used (following the "no" route from the decision operation 608), then the process 600 may advance to a decision operation 612.

At 612, the sound assignment module 254 may determine to select a commercial sound associated with a commercial entity to be assigned to the UAV for emission during the delivery. The commercial sound may be associated with an item in the package 106. For example, the commercial sound may be a jingle used by a manufacturer, producer, designer, or supplier of an item in the package 106. When a commercial sound is available and to be used (following the "yes" route from the decision operation 612), then the process 600 may advance to an operation 614 to assign the commercial sound, via the order-specific sounds module 252, for use by the UAV during the delivery of the package 106 to the customer. When the commercial sound is not available or not to be used (following the "no" route from the decision operation 612), then the process 600 may advance to a decision operation 616.

At 616, the sound assignment module 254 may determine to select an auto-assigned sound to be assigned to the UAV for emission during the delivery. The auto-assigned sound may be a sound that is assigned to the customer based on information about the customer, such as information in a customer profile that may indicate likes and dislikes of the customer pertaining to sounds. For example, the auto-assigned sound may be classical music when the customer previously purchased classical music to be delivered by a UAV or by other delivery mechanisms. When an auto-assigned sound is available for determination and to be used (following the "yes" route from the decision operation 612), then the process 600 may advance to an operation 618.

At 618, the customer preference module 248 may determine the auto-assigned sound for use by the UAV during the delivery of the package 106 to the customer, possibly using the data 256 that includes information about the customer. At 620, the auto-assigned sound may be assigned to the UAV for emission during the delivery.

When the auto-assigned sound is not available or not to be used (following the "no" route from the decision operation 616), then the process 600 may advance to an operation 622. At 622, the sound assignment module 254 may assign a default sound for use by the UAV during the delivery of the package 106 to the customer. The default sound may mimic an environmental sound and/or otherwise be a sound associated with calmness, animals or birds, and/or other non-threatening objects while not being annoying, offensive, or a nuisance.

Following at one of the operations 606, 610, 614, 620, and 622, the sound assignment module 254 may upload the assigned sound to the UAV, possibly along with other sounds to be emitted by the UAV during the flight of the UAV to/from the destination. The sounds assigned at the operations 606, 610, 614, 620, or 622 may be used at the approach stage or deposit stage of the delivery, such as pertaining to the operations 418 and/or 420 described in the process 400.

Figure 7:
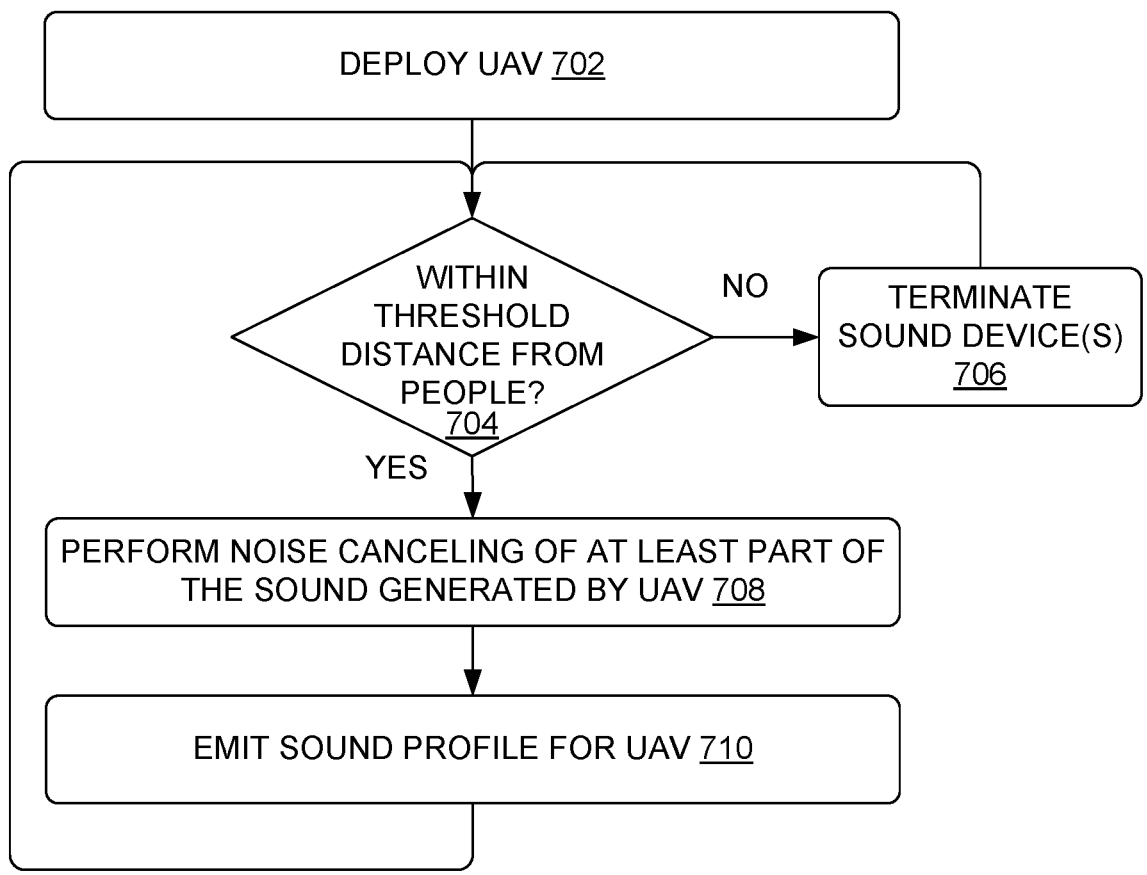
FIG. 7 is a flow diagram of an illustrative process to perform at least partial noise-canceling during operation of the UAV.

FIG. 7 is a flow diagram of an illustrative process 700 to perform at least partial noise-canceling during operation of the UAV. The process 700 is described with reference to the environment 100 and the architectures 200 and 240.

At 702, the UAV may be deployed to fly to a destination to deposit a package for a customer. The UAV may be deployed from a fulfillment center, for example.

At 704, the location analysis module 228 may determine whether the UAV is within a threshold distance from people and/or from places that people typically reside or congregate (e.g., from buildings, public parks, beaches, etc.). The location analysis module 228 may base this determination on an altitude of the UAV and/or on other factors. The location analysis module 228 may determine the location based on predetermined configurations, by analyzing imagery captured by imaging devices on the UAV, and/or using other techniques. When the UAV is not within the threshold distance (following the "no" route from the decision operation 704), then the process 700 may advance to an operation 706. At 706, the sound device controller 226 may terminate operation of any sound device (e.g., the speaker 214(2) and/or the sound devices 214(M)), and then return to the decision operation 704.

When the UAV is within the threshold distance (following the "yes" route from the decision operation 704), then the process 700 may advance to an operation 708. At 708, the noise canceling module 222 may perform noise canceling using input from the microphone 214(1) and output by the speaker(s) 214(2). The noise canceling module 222 may attempt to cancel all the noise generated by the propellers and/or motors of the UAV or portions of the sounds that are regarded or classified as annoying and a nuisance to bystanders that can hear the noise.

At 708, the sound device controller 226 may cause the speaker(s) 214(2) and/or the sound devices 214(M) to emit sound while the noise canceling module 222 causes at least some of the UAV noises to be canceled and while the UAV is within the threshold distance from people. Following the operation 708, the process 700 may return to the decision operation 704 after a random or fixed amount of time has passed. By performing the decision operation 704 and selectively terminating sound devices, the UAV 104 may conserve power resources.

Figure 8:
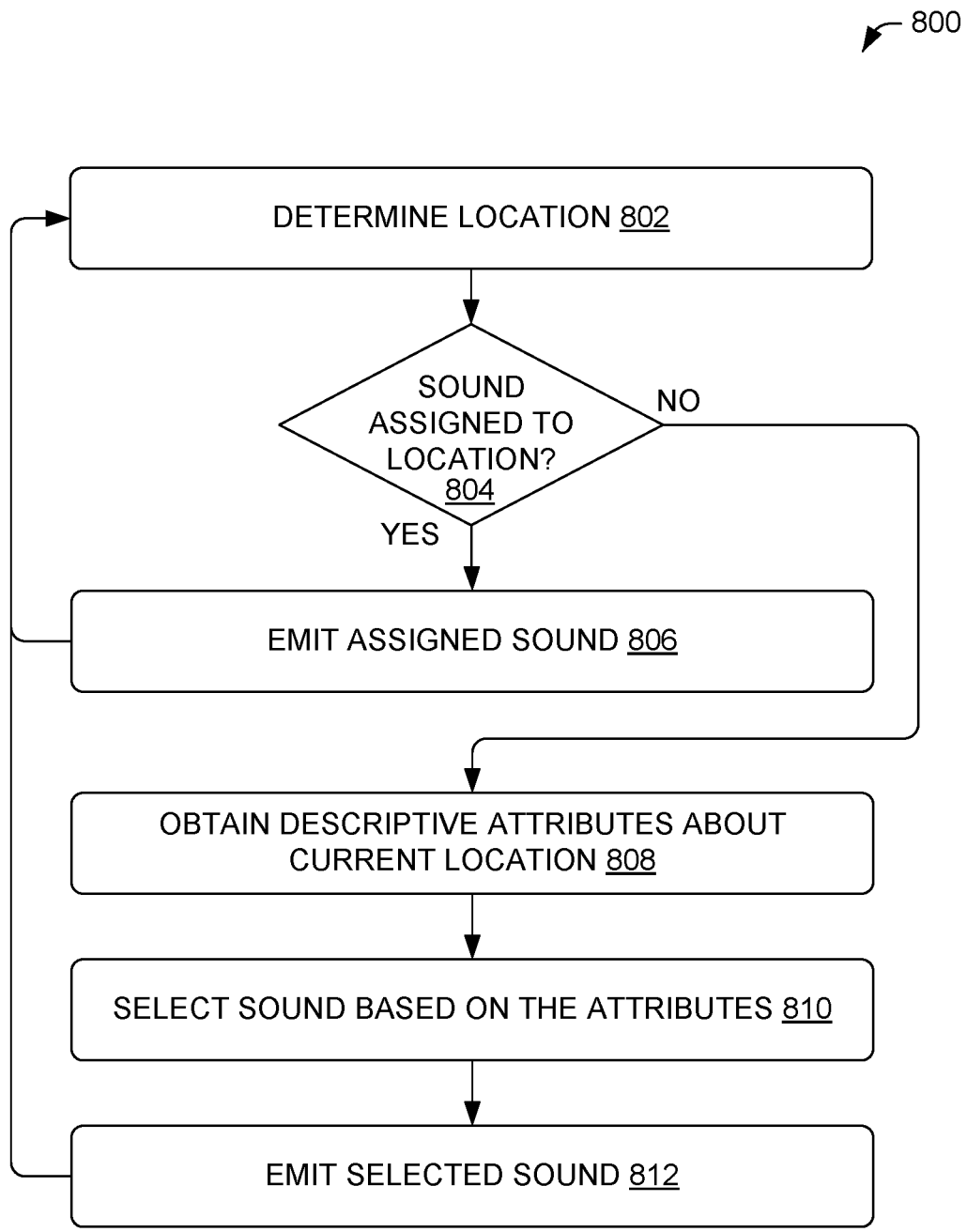
FIG. 8 is a flow diagram of an illustrative process to select sounds to emit based at least partly on attributes of a location of the UAV.

FIG. 8 is a flow diagram of an illustrative process 800 to select sounds to emit based at least partly on attributes of a location of the UAV. The process 800 is described with reference to the environment 100 and the architectures 200 and 240.

At 802, the location analysis module 228 and/or the navigation system 208 may determine a location of the UAV 208 during a flight to a destination. The location by be a general area within airspace or over an area of land, such as over a city, over a forest, over a populated area, over a farm, etc.

At 804, the sound selection module 224 may determine whether a sound is assigned to the location determine at the operation 802. When a sound is assigned to the location (following the "yes" route from the decision operation 804), then the process 800 may advance to an operation 806. At 806, the sound selection module 224 may assign the sound to be emitted, via the sound device controller 226, while the UAV flies over the location. Following the operation 806, the process 800 may return to the operation 802 to update the location after a random or fixed amount of time has passed, for example.

When a sound is not assigned to the location (following the "no" route from the decision operation 804), then the process 800 may advance to an operation 808. At 808, the location analysis module 228 may obtain descriptive attributes about the current location. The descriptive attributes may be extracted from an analysis of imagery, such as to determine whether the area include buildings, trees, people, animals, and/or other known objects.

At 810, the sound selection module 224 may select a sound based on the attributes determined at the operation 808. For example, if the attributes indicate that the current location is over a forest, the sound selection module 224 may cause the UAV to emit sounds commonly hear in a forest. As another example, if the attributes indicate that the current location is over a city, the sound selection module 224 may cause the UAV to emit sounds commonly hear in the city or other sounds that are soothing to people. As yet another example, if the attributes indicate that the current location is over a farm or rural area, the sound selection module 224 may cause the UAV to emit sounds commonly hear in those respective areas, such as sounds of birds or other animals or farm machines. At 812, the sound device controller 226 may cause the UAV, via the speaker(s) 214(2) and/or the sound devices 214(M), to emit the sounds selected at the operation 810. Following the operation 812, the process 800 may return to the operation 802 to update the location after a random or fixed amount of time has passed, for example.

Figure 9:
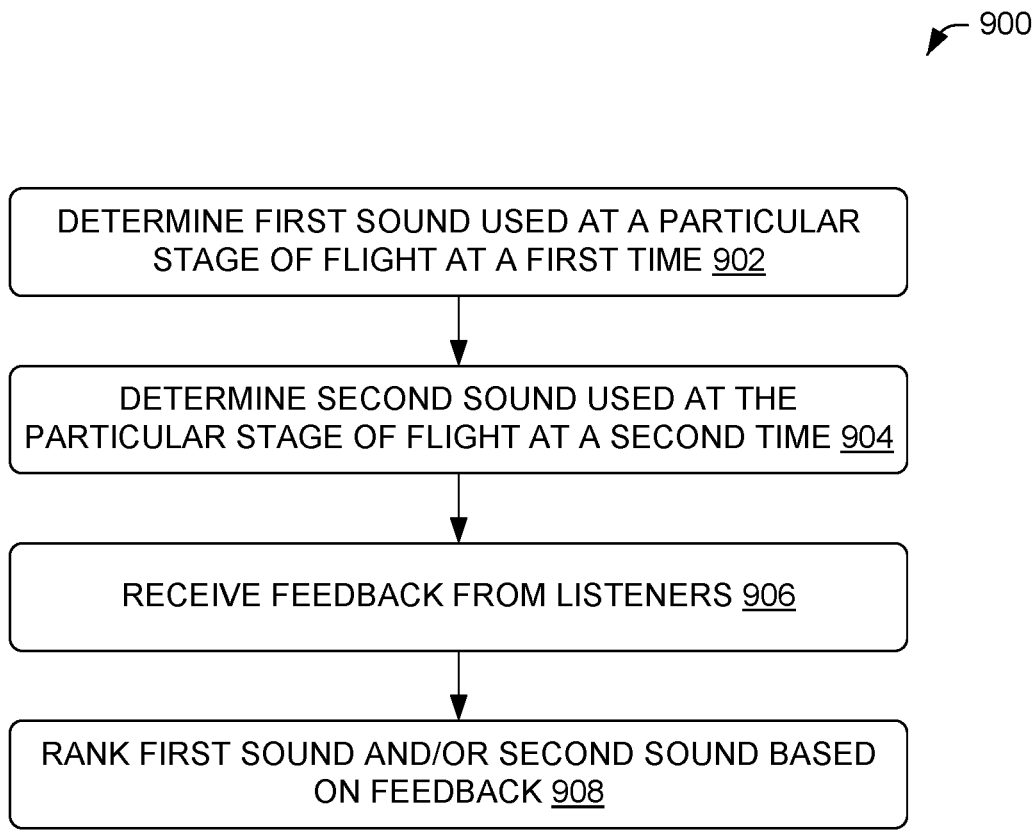
FIG. 9 is a flow diagram of an illustrative process to test sounds and receive feedback from listeners enabling ranking of the sounds based on the feedback.

FIG. 9 is a flow diagram of an illustrative process 900 to test sounds and receive feedback from listeners enabling ranking of the sounds based on the feedback. The process 900 is described with reference to the environment 100 and the architectures 200 and 240.

At 902, the sound assignment module 254 may determine a first sound used at a particular stage of flight of the UAV at a first time. At 904, the sound assignment module 254 may determine a second sound used at the particular stage of flight of the UAV at a second time, which may be during a different flight for a different delivery. The particular stage from the first time and the second time may be similar or a same stage of flight.

At 906, the sound assignment module 254 may receive feedback from bystanders and/or other people who may be able to hear the first sound, the second sound, or both, and provide feedback usable to rank the sounds. The ranking may indicate a preference by the bystanders and/or other people for the first sound or the second sound.

At 908, the sound assignment module 254 may rank the first sound and/or the second sound based on the feedback. The ranking may be a numerical ranking, a binary ranking (use again, do not use again), and/or other types of rankings that may be used to determine future use and frequency of the respective sounds. The process 900 may be used to test new sounds and/or test current sounds over time to ensure the sounds are found to be pleasing to customer, who may have evolving tastes and preferences regarding sounds, and in particular, regarding sounds emitted from UAVs.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
   one or more processors;
   one or more passive sound devices;
   one or more sound device controllers; and
   memory storing one or more computer-executable instructions that, when executed, cause the one or more processors to:
   determine a destination for delivery of a package by an unmanned aerial vehicle (UAV);
   determine a sound device controller of the one or more sound device controllers, the sound device controller associated with a passive sound device of the one or more passive sound devices;
   cause the passive sound device to emit a first type of sound based at least in part on a first orientation of the passive sound device and one or more first attributes associated with a first type of environment surrounding the system, the first type of sound at least one of simulating or being consistent with one or more first sounds output within the first type of environment;

cause the sound device controller to change an orientation of the passive sound device from the first orientation to a second orientation that is different than the first orientation; and cause, based at least in part on the second orientation and one or more second attributes associated with a second type of environment surrounding the system, the passive sound device to emit a second type of sound, the second type of sound at least one of simulating or being consistent with one or more second sounds output within the second type of environment.

2. The system as recited in claim 1, wherein at least one of the one or more passive sound devices is a fin, reed, or a whistle.

3. The system as recited in claim 1, wherein at least one of the one or more passive sound devices is coupled to at least one of a propeller, a motor, or a drive shaft of the UAV.

4. The system as recited in claim 1, wherein at least one of the first type of sound or the second type of sound is associated with the delivery of the package.

5. The system as recited in claim 1, wherein at least one of the first type of sound or the second type of sound is configured to indicate an arrival of the UAV at a fulfillment center.

6. The system as recited in claim 1, further comprising:
a network interface coupled to the one or more processors, and wherein the one or more computer-executable instructions, when executed, further cause the one or more processors to:
receive, via the network interface, data from at least one of a command center or a different UAV.

7. The system as recited in claim 6, wherein the data comprises rules associating a portion of a flight with at least one of the first type of sound or the second type of sound.

8. The system as recited in claim 1, wherein causing the passive sound device to emit at least one of the first type of sound or the second type of sound is based at least in part on information associated with a recipient of the package, the information causing the one or more passive sound devices to refrain from emitting a particular type of sound.

9. A method comprising:
determining a destination for delivery of a package by an unmanned aerial vehicle (UAV);
determining a sound device controller associated with a passive sound device;
causing the sound device controller to change an orientation of the passive sound device; and
causing, based at least in part on the change in orientation and one or more attributes of an environment associated with the UAV, the passive sound device to emit a sound that at least one of simulates or is consistent with one or more sounds output within the environment.

10. The method as recited in claim 9, wherein the passive sound device is a fin, reed, or a whistle.

11. The method as recited in claim 9, wherein the sound is configured to indicate an arrival of the UAV at a fulfillment center.

12. The method as recited in claim 9, wherein the UAV comprises a propeller coupled to a second passive sound device, the method further comprising:
causing the propeller to rotate.

13. The method as recited in claim 12, further comprising:
based at least in part on causing the propeller to rotate, causing the second passive sound device to emit a second sound.

14. The method as recited in claim 12, wherein the second passive sound device is at least one of a dimple or an aperture in the propeller, the dimple or the aperture configured to modify a second sound caused by the propeller.

15. An unmanned aerial vehicle (UAV) comprising:
one or more processors;
one or more passive sound devices;
one or more sound device controllers; and
memory storing one or more computer-executable instructions that, when executed, cause the one or more processors to:
determine a sound device controller of the one or more sound device controllers, the sound device controller associated with a passive sound device of the one or more passive sound devices; and
cause at least one of the sound device controller or the passive sound device to change an orientation, wherein the change in orientation causes the passive sound device to emit a sound, and a type of the sound is at least one of based at least in part on an identity of a recipient of a package being transported by the UAV or is unique to the recipient.

16. The UAV as recited in claim 15, wherein the sound device controller is a propeller and the passive sound device is coupled to the propeller.

17. The UAV as recited in claim 15, wherein at least one of the one or more passive sound devices is a fin, reed, or a whistle.

18. The UAV as recited in claim 15, wherein the one or more computer-executable instructions, when executed, further cause the one or more processors to:
cause at least one of the sound device controller or the passive sound device to change to a second orientation, wherein the change to the second orientation causes the passive sound device to emit a second sound.

19. The UAV as recited in claim 15, further comprising:
a network interface coupled to the one or more processors, and wherein the one or more computer-executable instructions, when executed, further cause the one or more processors to:
receive, via the network interface, data from at least one of a command center or a different UAV, the data including rules associating a portion of a flight with the sound.

20. The UAV as recited in claim 15, wherein the type of sound is selected by the recipient of the package.